United States Patent [19]
Levin et al.

[11] 3,835,269
[45] Sept. 10, 1974

[54] DEICING DEVICE

[76] Inventors: Igor Anatolievich Levin, Petrozavodskaya ulitsa 15, korpus 1,kv.113., Moscow; Konstantin Ivanovich Skobelev, Teatralny pereulok,40,kv.50.; Lev Iosifovich Levkovich, ulitsa Tekucheva 143,kv.48.; Boris Andreevich Pavljuk, ulitsa Vorovskogo,46,kv.37., all of Rostov-na-Donu, U.S.S.R.

[22] Filed: May 7, 1973

[21] Appl. No.: 358,123

[52] U.S. Cl. .................................................. 191/62
[51] Int. Cl. .................................................. B60l 5/02
[58] Field of Search ................... 191/45, 50, 59, 62

[56] References Cited
UNITED STATES PATENTS
2,791,668   5/1957   Cowdrey .............................. 191/62

*Primary Examiner*—M. Henson Wood, Jr.
*Assistant Examiner*—D. W. Keen
*Attorney, Agent, or Firm*—Eric H. Waters

[57] ABSTRACT

A device for deicing the surface of a wire, mainly the contact wire of electric transport facilities, comprising an appliance for generating electromagnetic field pulses acting on said wire; said appliance is installed in close proximity to the wire and secured relative to it on a support installed on a movable transport vehicle. The appliance for generating electromagnetic field pulses is constituted by an electromagnetic inductor made in the form of wire turns accommodated in a dielectric casing and connected to a power supply system. There is an approximately uniform gap "a" between said wire turns of the electromagnetic inductor and the wire to be deiced. The support for fastening said electromagnetic inductor is mounted on the current collector of the transport vehicle and is provided with various types of holders to which the electromagnetic inductor is directly secured. The wire turns of the electromagnetic inductor may be either circular or elliptical in shape with the larger axis of the ellipse directed either along or across the wire to be deiced.

20 Claims, 14 Drawing Figures

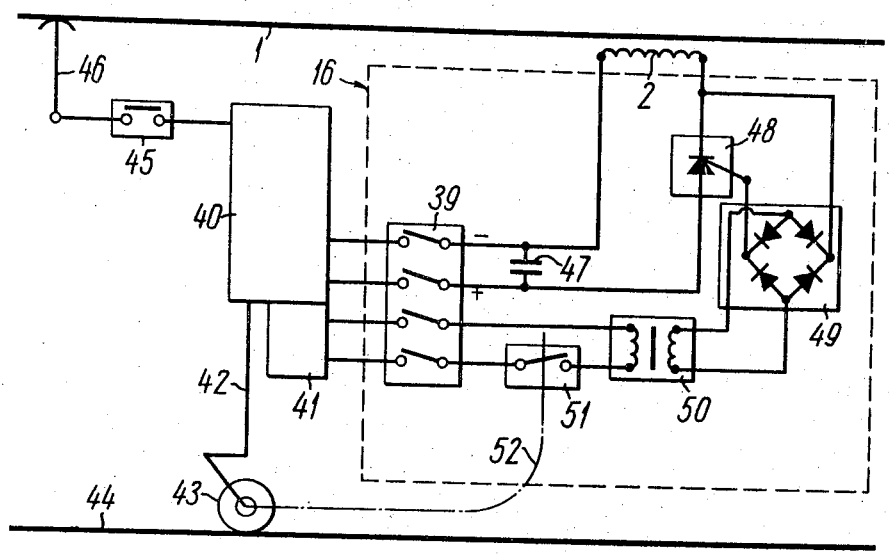
FIG. 9
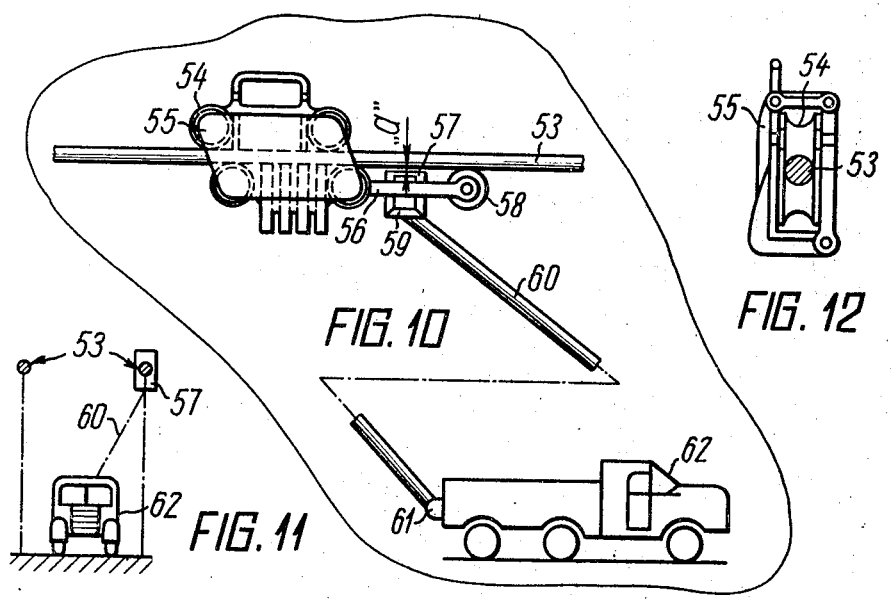
FIG. 10
FIG. 12
FIG. 11

DEICING DEVICE

The present invention relates to an improvement of deicing devices and more specifically it relates to the devices for removing ice from the surface of wires and can be utilized for, say, protecting the contact wires of electric transport facilities, electric transmission lines, cables of suspension bridges, etc., against icing.

The present invention is capable of removing ice from the surfaces of various types of wires, including doublestrand, triple-strand wires, multiple-wire bunches, cables, flexible and rigid conductors used as contact wires for power supply of electric transport facilities and other types of wires of different cross-sections. The contact rails of electric transport facilities also belong to this group.

The present invention can be utilized with a transport vehicle, this term denoting any vehicle suitable for this purpose, capable of moving relative to a wire, e.g. an electric locomotive, streetcar, trolley bus, rail car, railway wagon, motor vehicle, self-propelled or trailing trolley, etc.

Known in the previous art are wire deicing devices whose operating principle is based on heating the wires, striking them or creating long and continuous vibrations. One of these devices, for example, heats the wires by short-circuiting separate sections of the electric mains while other devices comprise impact drums and vibratory pantographs.

All these devices are characterized by a number of serious disadvantages which interfere with their widespread use. The devices utilizing the method of heating require large amounts of power; besides, the traffic of electric locomotives must be stopped for the time of short-circuiting the mains section.

The devices based on the impact and vibration methods curtail the life of the wires, impair their strength and consume a considerably high power. All these devices are insufficiently effective.

Owing to the absence of convenient devices for deicing the wires, the electric traction has to be substituted by Diesel traction during the period of icing of the contact wires.

This involves undue expenses and the necessity of providing standby Diesel locomotives or reducing the traffic-carrying capacity of railways.

Known in the art is a device for deicing the surfaces of thin-walled structures which converts electric current pulses into the pulses of elastic deformation of the wall to be protected. This device comprises appliances which generate electromagnetic field pulses, said pulses being transmitted to the wall and causing its elastic deformation. These appliances are located close to the protected wall and are secured to a structure rigidly connected with said wall.

This method of deicing is highly effective and economical. However, the known device ensures the removal of ice from the wall which is immovable relative to the device. Therefore, if this device is to be used for deicing a wire, it is necessary to secure a large number of appliances along said wire for generating electromagnetic field pulses, which complicates operation.

An object of the present invention resides in eliminating the aforesaid disadvantages.

Another object of the invention is to provide a device for deicing wires based on the electric pulse method of removing ice from the surface of wires.

This and other objects are accomplished by providing a deicing device comprising an appliance which generates intermittent electromagnetic field pulses, installed in close proximity to the protected surface for creating elastic deformation in the latter wherein, according to the invention, said appliacne is used for removing ice from the surface of a wire, mainly the contact wire of electric transport facilities and is secured relative to said wire on a support which is installed on a transport vehicle for joint movement relative to the wire.

The effect of intermittent electromagnetic field on the wire produces pulse-type elastic deformation of the wire, said deformation moving along the wire.

The device according to the invention draws a small amount of power at the same time being highly efficient. The remote impact-free action on the wire within the limits of its elastic deformation extends its service life. Besides, the device according to the invention can be used without stopping the normal transport traffic.

The device according to the invention can be used at the lowest ambient air temperatures at which icing can be expected and with the maximum possible thicknesses of ice.

Depending on the point of application, the device according to the invention can be realized in different designs. If the device is intended for deicing an overhead contact wire or a contact rail of electric transport facilities, it is practicable that the support for securing the appliance generating electromagnetic field pulses be located on the current collector of the electric transport vehicle, e.g., trolley bus or electric locomotive. Such a layout simplifies the design since it disposes of additional parts required for a separate support.

It is practicable that the appliance generating electromagnetic field pulses be made in the form of an electromagnetic inductor consisting of several turns of wire accommodated in a dielectric casing and connected to electric power supply and that the gap between the inductor wire turns and the wire being protected be approximately constant. Besides being compact and efficient, the electromagnetic inductor is one of the most reliable appliances for generating electromagnetic field pulses.

One of the simplest types of support for fastening the electromagnetic inductor on the current collector of the electric transport vehicle is a structure consisting of an articulated spring-loaded holder which carries a guide element contacting the wire and an appliance for generating electromagnetic field pulses.

To simplify the design, the dielectric casing of the electromagnetic inductor can be used as the element contacting the wire.

If the device is intended for deicing trolley bus wires or contact rails, when the current collector is not displaced laterally with relation to the wire, it is practicable that the guide element be provided with a roller contacting the wire with a view to extending the service life of the device. This substitution of sliding motion by rolling will diminish the wear of the guide element and the wire.

When the current collector is little displaced laterally relative to the wire, it is practicable that the wire turns of the electromagnetic inductor be made of an elliptical shape with the larger axis of the ellipse directed along the wire. This shape of the electromagnetic inductor improves its efficiency because it brings the side portions of the wire turns nearer to the wire being deiced, thereby increasing the secondary current in the latter.

To cut down the wear of the current collectors sliding over an overhead contact wire, e.g. pantographs of electric locomotives or streetcar bow collectors, the contact wire is usually arranged in a zig-zag manner. In this case, owing to large lateral displacements of the wire relative to the current collector, it is practicable that the electromagnetic inductor be made of an elliptical shape with the larger axis of the ellipse directed approximately square to the wire.

Besides, in the zig-zag arrangement of the contact wire it is possible to have a U-holder provided with at least two electromagnetic inductors placed symmetrically on both sides of the wire in which case it is practicable that the wire turns of the inductor be made circular. It is practicable that the electromagnetic inductor be arranged on the U-holder in a staggered order relative to the wire so as to overlap the maximum efficiency zones of the inductors. Such an arrangement improves the efficiency of the device since, no matter how large the lateral displacement of the contact wire, it will always stay in the high-efficiency zone.

In case of a double-strand or triple-strand overhead contact wire a good practice is to use the above described embodiments of the device intended for the zig-zag arrangement of the contact wire (elliptical inductors with the larger axis directed across the wire, several circular inductors, etc.).

Besides, it is practicable that the support for fastening the electromagnetic inductor be made in the form of a U-holder consisting of a movable part and a fixed part interconnected by a hinge and that said holder be installed on two slides of the current collector.

It is practicable that the power supply system of the electromagnetic inductor be provided with a converter unit comprising a pulse capacitor battery which should be connected at one end to the electromagnetic inductor across a thyristor and at the other end, to the wire through the power supply system of the transport vehicle.

Should it become necessary to deice a wire which does not function as a contact wire, it is practicable that the transport vehicle with the appliance for generating electromagnetic field pulses be moved over the wire to be deiced.

In this case the transport vehicle (trolley) will constitute a part of the deicing device since its function is confined to moving the pulse-generating appliances. The dimensions and speed of this vehicle (trolley) depend on the weight and dimensions of the appliances and on the fixed period of pulse delivery. If the wire to be deiced is a part of an electric transmission system and is under voltage, it is practicable that said transport vehicle be of the selfpropelled type supplied with electric power from the wire being deiced.

If the wire to be deiced is not part of the electric transmission system and is not live as, for example, a loadcarrying cable of a suspension bridge, said transport vehicle (trolley) moves over the wire being deiced and is supplied with electric power by means of a self-propelled vehicle connected with it.

Experience has shown that the use of the wire deicing device involves removal of ice from the current collector proper; therefore, it is practicable that the deicing device be provided with one or more electromagnetic inductors for deicing the elements of the current collector.

Other features will more clearly hereinafter appear, by reference to the accompanying drawings, forming a part of this specification and wherein like characters of reference designate corresponding parts throughout the several views.

Figure 7:
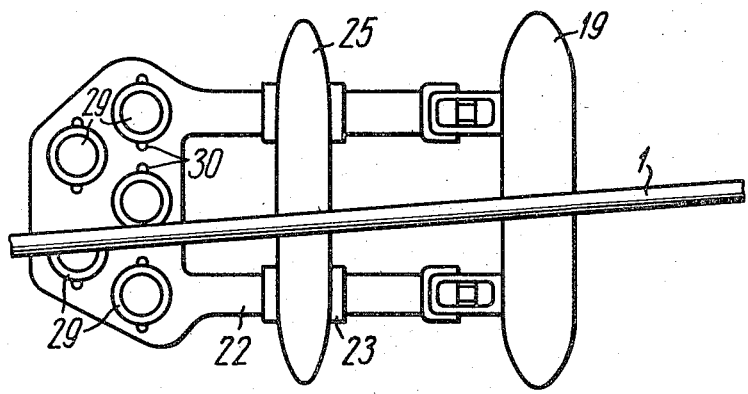
Figure 8:
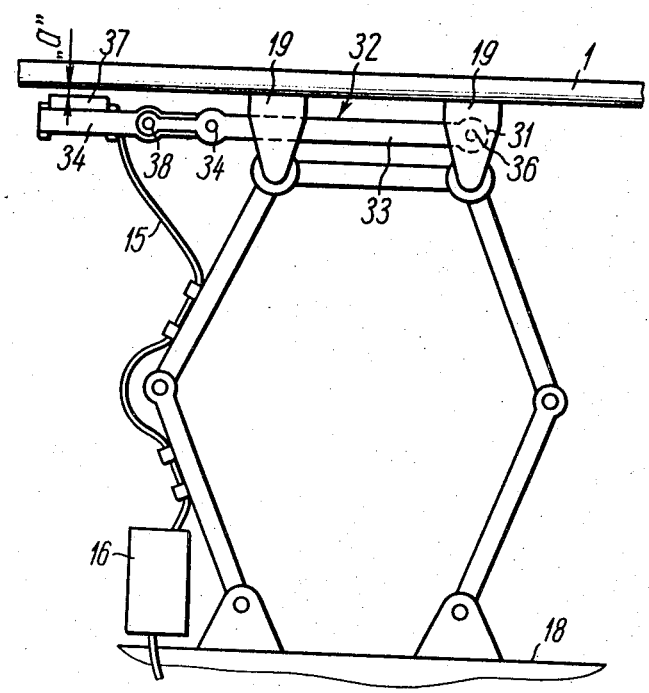
Figure 13:
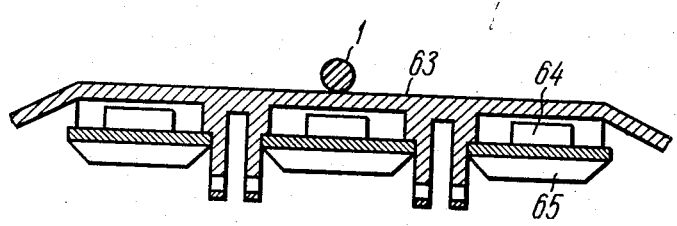
Figure 14:

FIG. 7 — same, with electromagnetic inductors arranged in a staggered order and consisting of circular wire turns;

FIG. 8 shows the deicing device installed on the pantograph of an electric locomotive with two slides;

FIG. 9 is the wiring diagram of the deicing device;

FIGS. 10, 11, 12 show the device for deicing the cable of a suspension bridge;

FIGS. 13, 14 show the installation of additional electromagnetic inductors on the slide of the electric locomotive pantograph.

Figure 1:
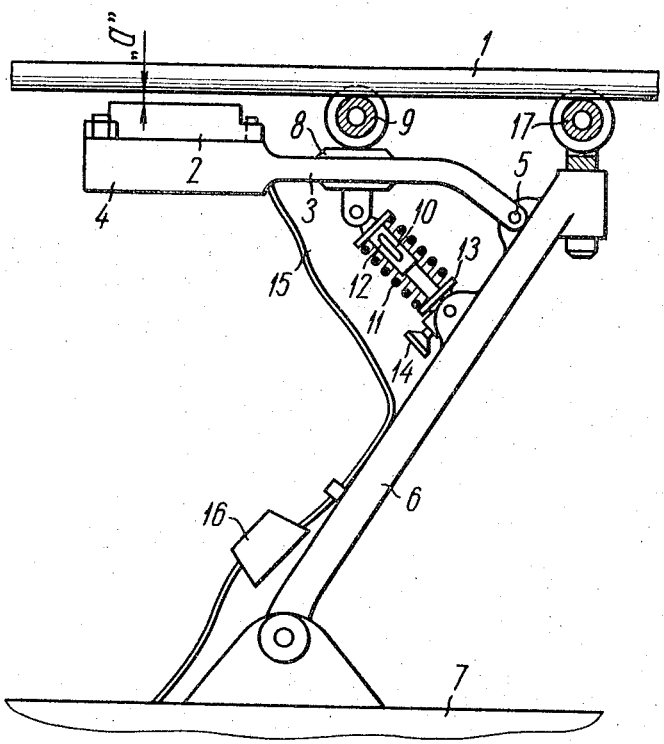
FIG. 1 shows the deicing device according to the invention, installed on the current collector of a trolley bus.
Figure 2:
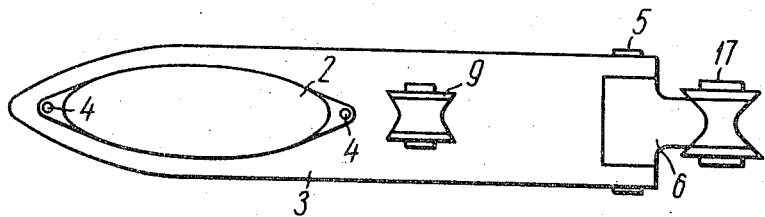
FIG. 2 is a plan view of FIG. 1.
Figure 3:
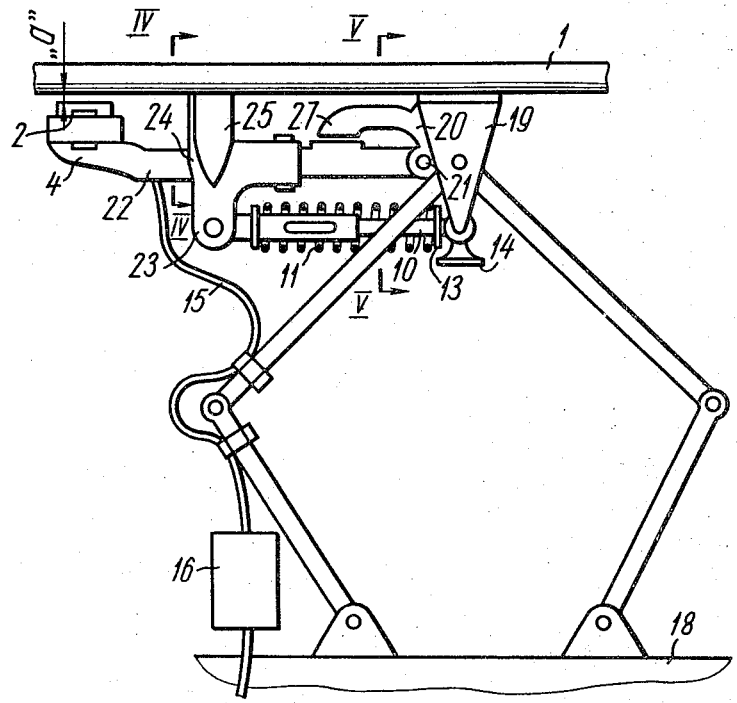
FIG. 3 shows the deicing device installed on the pantograph of an electric locomotive.
Figures 4, 5:
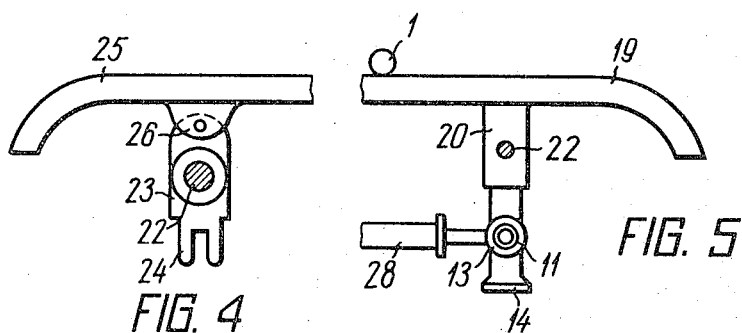
FIG. 4 is a section taken along line IV—IV in FIG. 3.
FIG. 5 is a section taken along line V—V in FIG. 3.
Figure 6:
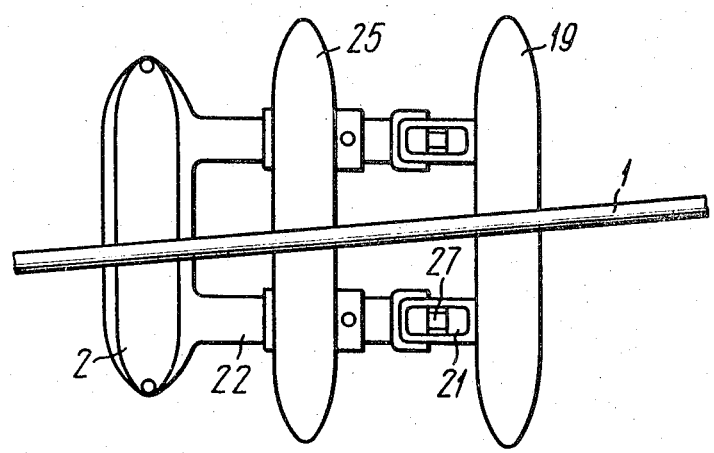
FIG. 6 is the deicing device installed on the pantograph of the electric locomotive and incorporating an electromagnetic inductor with elliptical wire turns.

It can be seen in FIGS. 1 and 2 that the device for deicing the surface of a wire 1 comprises an electromagnetic inductor 2 consisting of several wire turns in a dielectric casing. The wire turns of the electromagnetic inductor 2 have an elliptical shape in plan view with the larger axis arranged along the wire 1 being deiced while the electromagnetic inductor 2 is fastened to a holder 3 by bolts 4, the holder 3 being installed with the aid of a hinge 5 on the upper part of the current collector 6 of a transport vehicle 7, e.g., a trolley bus. Mounted on the holder 3 between the electromagnetic inductor 2 and the hinge 5 is a guide element 8 with guide rollers 9 which are in direct contact with the wire being deiced. Between the lugs on the holder 3 and those on the rod of the current collector 6 is located a sleeve 10 on which a compression spring 11 is slipped. The sleeve 10 consists of two telescopic links so that its length can be changed. The sleeve 10 has a cutout accommodating a stop which prevents twisting of the spring 11 and limits the extension of the telescopic parts of the sleeve 10, thereby restricting the turning of the holder 3 around its hinge 5. In the working position the sleeve 10 is extended not to a maximum so that the compressed spring 11 presses the roller 9 to the wire 1 via the holder 3 and the guide element 8. In this position the required gap ($a$) is formed between the wire 1 and the wire turns of the electromagnetic inductor 2. The size of the gap ($a$) is selected so as to prevent it from diminishing to zero in case of possible shifting of parts during installation and operation and to keep it sufficiently small for efficient functioning of the device.

Inside the sleeve 10 there is a screw mechanism 13 with a handle 14 brought outside. If the handle 14 is rotated, the screw mechanism 13 can compress the spring 11 and thus reduce the length of the sleeve 10 to a minimum. During this reduction of the length of the sleeve 10 the holder 3 with the guide roller 9 and electromagnetic inductor 2 are shifted through the required distance away from the wire 1 being deiced.

The electric power is supplied to the electromagnetic inductor 2 through a flexible wire 15 which is connected, across a converter unit 16, to the power supply system of the transport vehicle 7, which, in turn, is supplied from the wire 1 through a roller 17 and the current collector 6.

With the current collector 6 in the working position the rollers 9 and 17 are pressed against the wire 1. In this position the length of the sleeve 10 is somewhat smaller than maximum so that the force of the spring 11 is transmitted to the holder 3 and presses the guide roller 9 against the wire 1 while the gap $a$ formed between the wire 1 and the wire turns of the electromagnetic inductor, required for efficient functioning of the deicing device, is practically uniform.

When the current collector 6 is lowered for deenergizing the vehicle, the deicing device is simultaneously withdrawn from the wire 1; conversely, when the current collector 6 is brought in contact with the wire 1, the deicing device comes simultaneously to the working position.

If the deicing device is to be withdrawn from service for a certain period, it is praacticable that it should be moved away from the wire; for this purpose the handle 14 should be rotated for actuating the screw mechanism 13 which will reduce the length of the sleeve 10 to a minimum. The holder 3 with the electromagnetic inductor 2 will move and the guide roller 9 will withdraw from the wire 1.

To bring the deicing device to the initial position, the handle 14 should be rotated in the opposite direction thereby extending the sleeve 10 to a certain length by the screw mechanism 13, putting the guide roller 9 in contact with the wire 1 and setting a certain gap $a$ between the turns of the electromagnetic inductor 2 and the wire 1.

It is possible, particularly in summer, to remove the deicing device completely from the transport vehicle 7.

Let us consider an embodiment of the device for deicing the wire 1 wherein the transport vehicle is constituted by an electric locomotive 18 (FIGS. 3, 4, 5, 6).

In this case the pantograph slide 19 of the electric locomotive 18 is provided with two brackets 20. A U-holder 22 is secured to the upper lugs of the brackets 20 by hinges 21. A guide element 23 and the electromagnetic inductor 2 are installed and fastened on the U-holder 22. The guide element 23 consists of a shaped bracket 24 and a guiding slide 25 secured by bolts 26. The guiding slide 25 is made of a non-conducting material, e.g. plastic, and is fastened to the shaped bracket 24. The guiding slide 25 is detachable and can be replaced, when worn. Two sleeves 10 with springs 11 installed on the pantograph slide 19 between the lugs of the shaped bracket 24 and the lower lugs of the brackets 20 have been described in detail hereinbefore and perform similar functions. To limit the up-and-down movement of the U-holder 22 around hinges 21, adjustable stops 27 are installed near the upper lugs of the bracket 20. Rotation of the screw mechanism 13 of the sleeves 10 is synchronized by interconnecting said mechanisms by a universal joint shaft 28.

As in the preceding case, the electric power is supplied through a flexible wire 15 which is connected to the power supply system of the electric locomotive 18 via the electric converter unit 16.

When the pantograph of the electric locomotive 18 (FIG. 3) is in the working position, the pantograph slide 19 and the guiding slide 25 are pressed against the wire 1. In this position the gap $a$ between the turns of the eledtromagnetic inductor 2 and the wire 1 is practically uniform which is required for ensuring efficient operation of the deicing device and preventing the wear of the surface of the electromagnetic inductor 2. In the working position of the U-holder 22 the clearances between said holder and adjustable stops 27 are such that at all the deviations of the wire 1 they do not diminish to zero. This guarantees the required forces with which the guiding slide 25 is pressed against the wire 1, said forces being produced by the springs 11 of the sleeves 10. As the pantograph of the electric locomotive 18 moves up and down, the deicing device simultaneously moves up and down. Similarly to the above described deicing device it is practicable that this device be withdrawn from the pantograph or removed completely for the periods when icing of wires is not expected.

The above-considered embodiment of the deicing device installed on the pantograph of the electric locomotive 18 comprises an electromagnetic inductor 2 (FIG. 6) whose turns in plan view have an elliptical shape with the larger axis directed approximately perpendicularly to the wire 1 being deiced.

The length of the larger axis of the turns of the electromagnetic inductor 2 as well as the length of the working portion of the guiding slide 25 contacting the wire 1 should be not smaller than that of the working portion of the pantograph slide 19. If this requirement is satisfied, the wire 1, no matter how far it is shifted laterally during operation, will be located opposite the turns of the electromagnetic inductor 2 and the working portion of the guiding slide 25.

There is another possible embodiment of the deicing device installed on an electric locomotive (FIG. 7).

Arranged in a staggered order relative to the wire 1 on the U-holder 22 are five electromagnetic inductors 29 secured by bolts 30. The wire turns of the electromagnetic inductors 29 are circular in a plan view.

Such an installation of the electromagnetic inductors 29 on the U-holder 22 promotes the efficiency of each electromagnetic inductor because circular turns of electromagnetic inductors render better service than the elliptical ones. However, such inductors 29 must be staggered in order to overlap the operating zones of individual inductors 29.

In other respects the deicing device is similar to that described before and shown in FIGS. 3, 4, 5 and 6.

Let us consider a version of the deicing device used with the pantograph of the electric locomotive 18 (FIG. 8) provided with two slides 19. In this case each slide 19 is provided with two brackets 31. The U-holder 32 consists of a fixed portion 33 and a movable portion 34 interconnected by hinges 35. The fixed portion 33 of the U-holder 32 is fastened by bolts 36 to said brackets 31 of both pantograph slides 19 of the electric locomotive 18. The movable portion 34 of the U-holder 32 carries an electromagnetic inductor 37 whose turns may be either elliptical or circular in shape. In the latter case the turns of the inductor 37 must be staggered. In the working position both portions of the U-holder 32 are fixed relative to each other by spring stops 38. To withdraw the deicing device for the period when icing of the wire 1 is not expected, it is necessary to force off the spring stops 38 and to withdraw the movable portion 34 of the U-holder 32 with the electromagnetic inductor 37 from the wire 1. When the movable portion 34 of the U-holder 32 is returned to the working position, the spring stops 38 snap automatically in position thus fixing reliably the electromagnetic inductor 37 relative to the wire 1 with a preset gap $a$ between them.

The electric power is supplied to the electromagnetic inductor 37 similarly to the method described above.

Now let us consider the power supply system of the deicing device (FIG. 9).

The power supply system comprises a converter unit 16 which is connected by a changeover switch 39 with the power circuit unit 40 of the electric locomotive 18 (FIG. 3) and with its auxiliary circuit unit 41 (FIG. 9). The power circuit unit 40 is connected at one end by a bus bar 42 with the wheel 43 of the electric locomotive which contacts the rail 44 serving as a return line while at the other end it is connected by a switch 45 with the electric locomotive pantograph 46 supplied from the wire 1 being deiced.

The converter unit 16 comprises a pulse capacitor battery 47 connected across a thyristor 48 to the electromagnetic inductor 2.

The thyristor 48 is turned on by a control circuit which comprises a semiconductor rectifier 49 interconnected with a transformer 50. Connected to the input winding of the transformer 50 is a switch 51 which, in turn, is connected by a kinematic system with the wheel 43 of the electric locomotive for ensuring an interval between pulses, the duration of which must be inversely proportional to the travelling speed of the electric locomotive.

Depending on the speed of the electric locomotive, its wheel 43 opens and closes the switch 51 via the kinematic system 52. When the electric locomotive is at a standstill, the time relay in the kinematic system 52 turns on the switch 51 periodically.

As the electric locomotive enters the wire-icing zone, the contacts of the switch 39 are closed automatically or by hand. The pulse capacitor battery 47 is connected to the locomotive power circuit unit 40 which supplies the battery with a high-voltage direct current. When the thyristor 48 becomes non-conducting, the pulse capacitor battery will be charged to the required voltage. The charging time of the pulse capacitor battery 47 should be set so as to be shorter than the shortest interval between the pulses at the maximum speed of the electric locomotive.

As the switch 51 is closed by the kinematic system 52, the auxiliary circuit unit 41 will make the thyristor 48 conducting through the switch 51, transformer 50 and semiconductor rectifier 49 and the pulse capacitor battery 47 will discharge through the electromagnetic inductor 2 and the thyristor 48. This pulse of electric current builds up a short-time variable electromagnetic field in the electromagnetic inductor 2, the amplitude of said field depending on the current in the turns of the electromagnetic inductor 2 and on the current variation rate $dl/dt$, while the duration of the field depends on the duration of the current pulse.

By selecting these parameters and the number of inductor turns in designing an electromagnetic inductor it is possible to produce the required pulse of the electromagnetic field.

This pulse will induce a secondary current in the wire 1 being deiced. The interaction of the primary current in the electromagnetic inductor 2 with the secondary current in the wire 1 will cause prompt elastic deformation and movement of the wire 1 in the direction perpendicular to its axis. The amplitude, speed and acceleration arising during this movement depend on the parameters of the electromagnetic field pulse, the size of the wire and the gap $a$ between the wire 1 and the inductor turns. If the pulse is short and the movement of the wire is small, the accelerations prove to be sufficient for deicing the required length of the wire. In this case the distant portion of the wire takes no art in its movement owing to inertia and serves as a kind of a second support for the moving wire (the first support being located at the point of contact between the wire 1 and the slide 19).

In selecting the parameters of the electromagnetic pulse, it is necessary to ensure a certain value of deformation of the wire being deiced within the elastic zone, i.e., to ensure that mechanical stresses in the wire do not exceed the fatigue strength of the wire material.

Another prerequisite for efficiency of the pulse lies in that the time of interaction between the currents in the electromagnetic inductor and the wire shall not exceed a quarter of the period of natural vibrations of the wire length being deiced.

After the discharge of the pulse capacitor battery 47 the voltage in the circuit formed by said battery 47, thyristor 48 and electromagnetic iuductor 2 drops to zero and makes the thyristor 48 non-conducting.

By this time the switch 51 will open, the pulse capacitor battery 47 will again start being charged thus making a pause between the pulses.

The process will be repeated over again but the point of interaction between the electromagnetic inductor 2 and the wire 1 will be shifted along the latter owing to the movement of the transport vehicle 7. The interval between the pulses should be selected so that at each travelling speed of the transport vehicle 7, the distance covered by it would be smaller than the length of the wire 1 cleared of ice during each pulse.

If the current collector has to be deiced while it has not yet been connected to the wire, the first pulse shall be taken from a power storage battery. This pulse may be less powerful (e.g. with a lower voltage of capacitor battery charge) since in this case the wire to be deiced is not long.

The deicing device can be used to remove ice from the cables of suspension bridges (FIGS. 10, 11, 12).

In this case a trailing trolley 55 is mounted on the cable 53 with the aid of rollers 54. Said trolley 55 carries a holder 56 which mounts an electromagnetic inductor 57 with a preset gap $a$, said inductor having circular or elliptical turns.

To prevent the surface of the electromagnetic inductor 57 from contacting the cable 53, the end of the holder 56 is fitted with a guard roller 58. Besides, the holder 56 is provided with a tow ring 59 connected to which is towing cable 60 with a power supply cable whose other end is secured by a ring 61 to a self-propelled device (motor vehicle) 62 provided with an electric generator ensuring power supply of the deicing device and its remote control.

A similar deicing device with a trailing trolley 55 can be used for deicing live wires. In this case the deicing device can be made self-propelling and draw power supply directly from the wire being deiced.

In some cases ice has to be removed from the elements of the transport vehicle proper, e.g. from the slide 63 (FIG. 13) of the electric locomotive pantograph. In this case additional electromagnetic inductors 64 must be installed near the slide 63. The additional electromagnetic inductors 64 are installed on brackets 65 which, in turn, are fastened to the slide 63. These inductors 64 can be switched on independently, when required.

It should be noted that in some cases the design of the deicing device may be simplified. For example, under most conditions of electric locomotive and streetcar service the devices can be switched on only after pulling off from rest. The device installed on towed trailing trolleys can be moved at a certain speed which will produce a constant fixed interval between the successive pulses and, as a consequence, make it possible to dispense with the elements of the kinematic system.

If the deicing device is operated within a short time, the external surface of the electromagnetic inductor can be allowed to become worn. In this case the function of the guide element will be performed by the insulated casing of the electromagnetic inductor which also will simplify the holder somewhat. The working gap $a$ ensuring the proper functioning of the device is formed by a certain thickness of the casing dielectric layer above the wire turns in the inductor.

We claim:

1. A deicing device comprising an appliance generating intermittent electromagnetic field pulses, installed in close proximity to the protected surface for creating elastic deformation in the latter; said appliance is utilized for removing ice from the surface of a wire, mostly the contact wire of electric transport facilities and secured relative to said wire on a support installed on a transport vehicle for joint movement relative to said wire.

2. A deicing device according to claim 1 wherein said appliance for generating electromagnetic field pulses is constitutued by an electromagnetic inductor in the form of wire turns accommodated in a dielectric casing and connected to power supply and wherein there is an approximately uniform gap $a$ between said wire turns on the electromagnetic inductor and the wire being deiced.

3. A deicing device according to claim 2 wherein the support located on the current collector of said transport vehicle comprises an articulated spring-loaded holder which carries said electromagnetic inductor whose dielectric casing is in contact with said wire and functions as a guide element.

4. A deicing device according to claim 2 wherein the wire turns of said electromagnetic inductor are elliptical in shape with the larger axis of the ellipse directed along said wire.

5. A deicing device according to claim 2 wherein the contact wire is zigazagged and said wire turns of said electromagnetic inductor are elliptical in shape with the larger axis of the ellipse directed approximately square to said wire.

6. A deicing device according to claim 2 wherein the contact wire is zigzagged and the U-holder carries at least two electromagnetic inductors located symmetrically on both sides of said wire, the wire turns of said electromagnetic inductors being circular in shape.

7. A deicing device according to claim 6 wherein the electromagnetic inductors are located on said U-holder in a staggered order relative to said wire.

8. A deicing device according to claim 2 wherein the electromagnetic inductor is supported by a U-holder consisting of a movable portion and a fixed portion interconnected by a hinge, said holder being installed on two slides of the current collector.

9. A deicing device according to claim 2 wherein the power supply system of the electromagnetic inductor incorporates a converter unit comprising a pulse capacitor battery connected at one end to the electromagnetic inductor across a thyristor while at the other end it is connected to said wire through the power supply system of said transport vehicle.

10. A deicing device according to claim 1 wherein the support of the appliance generating electromagnetic field pulses is located on the current collector of said transport vehicle.

11. A deicing according to claim 10 wherein the support located on said current collector of the transport vehicle comprises an articulated spring-loaded holder which carries a guide element contacting said wire, and said appliance for generating electromagnetic field pulses.

12. A deicing device according to claim 11 wherein said guide element is mounted with a guide roller contacting said wire.

13. A deicing device according to claim 10 wherein the support located on the current collector of said transport vehicle comprises an articulated spring-loaded holder which carries said electromagnetic inductor whose dielectric casing is in contact with said wire and functions as a guide element.

14. A deicing device according to claim 10 wherein the electromagnetic inductor is supported by a U-holder consisting of a movable portion and a fixed portion interconnected by a hinge, said holder being installed on two slides of the current collector.

15. A deicing device according to claim 1 wherein the support located on said current collector of the transport vehicle comprises an articulated spring-loaded holder which carries a guide element contacting with said wire, and said appliance for generating electromagnetic field pulses.

16. A deicing device according to claim 15 wherein said guide element is mounted with a guide roller contacting said wire.

17. A deicing device according to claim 15 wherein the contact wire is zigzagged and the U-holder carries at least two electromagnetic inductors located symmetrically on both sides of said wire, the wire turns of said electromagnetic inductors being circular in shape.

18. A deicing device according to claim 17 wherein the electromagnetic inductors are located on said U-holder in a staggered order relative to said wire.

19. A deicing device according to claim 1 wherein the transport vehicle carrying the appliance for generating electromagnetic field pulses moves directly over said wire.

20. A deicing device according to claim 19 wherein for deicing a deenergized wire, mainly a load-carrying cable of a suspension bridge, the transport vehicle, e.g. trailing trolley, moves over said wire and draws electric power supply from a self-propelled device connected to said trolley.

* * * * *